(12) United States Patent
Binsfeld

(10) Patent No.: US 6,293,323 B1
(45) Date of Patent: Sep. 25, 2001

(54) OFF-ROAD TIRE

(75) Inventor: Adrien Alphonse Binsfeld, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/491,932

(22) Filed: Jan. 27, 2000

(51) Int. Cl.$^7$ .......................... B60C 11/11; B60C 11/113; B60C 107/02; B60C 121/00
(52) U.S. Cl. ................ 152/209.16; 152/209.12; 152/209.22; 152/902
(58) Field of Search .............. 152/209.22, 902, 152/209.12, 209.13, 209.16, 146–151

(56) References Cited

U.S. PATENT DOCUMENTS

| | | | |
|---|---|---|---|
| D. 53,693 | * | 8/1919 | Stokes ................... D12/147 |
| D. 57,124 | * | 2/1921 | Githens ................. 152/209.22 |
| D. 177,233 | * | 3/1956 | Hawkinson ............ 152/209.12 |
| D. 367,448 | * | 2/1996 | Baus et al. ............. D12/146 |
| 3,559,712 | | 2/1971 | Verdier ..................... 152/209 |
| 3,559,714 | | 2/1971 | Verdier ..................... 152/361 |
| 3,799,231 | | 3/1974 | Boileau .................... 152/209 |
| 3,939,890 | * | 2/1976 | Abe ......................... 152/209.13 |
| 4,222,423 | * | 9/1980 | Jamain .................... 152/902 |
| 4,412,575 | * | 11/1983 | Maeda et al. ........... 152/209.22 |
| 4,649,976 | | 3/1987 | Cherveny et al. ....... 152/209 R |
| 4,727,917 | * | 3/1988 | Stewart ................... 152/209.22 |
| 5,058,643 | * | 10/1991 | Nakasaki ................ 152/209.22 |
| 5,188,683 | * | 2/1993 | Bonko ..................... 152/209.16 |
| 5,411,067 | * | 5/1995 | Beeghly et al. ........ 152/209.22 |
| 5,464,050 | * | 11/1995 | Bonko ..................... 152/209.12 |
| 5,538,060 | | 7/1996 | Van Der Meer et al. .. 152/209 R |
| 6,189,586 | * | 2/2001 | Guidry .................... 152/209.16 |

FOREIGN PATENT DOCUMENTS

| | | | | |
|---|---|---|---|---|
| 2157211 | * | 5/1973 | (FR) | ............... 152/209.12 |
| 2411094 | * | 7/1979 | (FR) | ............... 152/209.12 |
| 1195942 | * | 6/1970 | (GB) | ............... 152/209.12 |

* cited by examiner

Primary Examiner—Steven D. Maki
(74) Attorney, Agent, or Firm—David L. King; R W Brown

(57) ABSTRACT

An off-road pneumatic tire 10 having a plurality of lugs 14 extending from a first shoulder 16 to a second shoulder 18. The plurality of lugs 14 are separated by a plurality of wide grooves 20. The tire 10 has at least a first lug 22 and a second lug 24. The lugs 14 alternate circumferentially between the first lug 22 and the second lug 24. The first lugs 22 has three tread elements 30, 32, 34 separated by a first and second narrow groove 26, 28, and the second lug 24 has two tread elements 36, 38 separated by a third narrow groove 40. In a preferred embodiment, the respective lugs 14 incline from the first shoulder 16 to the second shoulder 18 and are interconnected by wide groove tie bars 44.

8 Claims, 5 Drawing Sheets

OFF-ROAD TIRE

TECHNICAL FIELD

This invention relates to a pneumatic tire and, more particularly, to a pneumatic tire for off-road use.

BACKGROUND ART

Tire designers are continuously working to improve a tire's working footprint. The working footprint affects the following tire variables: traction, noise, vibration, and handling. Although these variables are the same for all types of tires, the importance of each variable is dependent upon the type of tire. For example, in off-road tires, users are primarily concerned with the traction and vibration of the working footprint.

FIG. 4 shows the Goodyear RL-2 Radial Semi Xtra Tread Traction tire as seen in the 1984 Tread Design Guide at page 205. The RL-2 is an off-road tire used on articulated dump trucks, loaders, graders, and other off-road machinery. The RL-2 provides excellent traction, especially circumferential traction. However, in some applications the RL-2's tread design causes a higher than desired vibration.

A large portion of the vibration caused by a tire occurs when a lug either enters the footprint or leaves the footprint. Upon entering the footprint, the tread lug is compressed causing an impact vibration. When a tread lug leaves the footprint, the lug snaps back to its original position causing additional vibration. The amplitude of the vibration is highest when the footprint length is such that an entering lug impacts at the same time that a leaving lug snaps back to its original position.

Two major factors contributing to the high vibration of the RL-2 are the nearly axal alignment of the lugs and the width of the lateral grooves. The nearly axial alignment of the lugs allows a large percentage of each lug to enter the footprint at once. This causes an instantaneous compression of a large percentage of the lug and results in increased vibration. The RL-2 also has wide lateral grooves. Since wider grooves lower a tire's bending stiffness, the wide lateral grooves of the RL-2 result in a low circumferential bending stiffness allowing the tread to easily bend in a circumferential direction. The more the tread bends, the greater the lugs protrude from the tread surface and the greater the amplitude of the vibration caused by their impact and release. In addition to lowering a tire's bending stiffness, the wider grooves reduce the area of the lugs in the footprint of the tire. As a result, the pressure distributed upon each lug in the footprint is increased. As the pressure upon each lug is increased, the amount of deformation of the respective lug is increased, resulting in an increase in the amplitude of the vibration.

U.S. Pat. No. 4,649,976 discloses a tread with a plurality of series of independent tread elements separated by curved grooves, shown in FIG. 5. Each series of independent tread elements extends in a curved path across the width of the tread. Each tread element, in a respective series, is separated from the other tread elements by a straight groove. These straight grooves are of the same depth as the curved grooves. The tire disclosed in this patent provides a smoother ride than the RL-2 because the curved path allows the series of independent tread elements to overlap one another as they enter or leave the footprint. This overlap results lower vibrations because there is less compression as each tread element enters the footprint and less snap back as each element leaves the footprint.

This invention makes further improvements to the working footprint of an off-road tire. The tire of this invention provides excellent traction, yet lower vibration than the tires disclosed in the prior art.

SUMMARY OF THE INVENTION

This invention relates to a pneumatic tire for off-road use. The pneumatic tire has a tread with a plurality of lugs. Each lug extends across the tread from a first shoulder to a second shoulder. The tire also has a plurality of wide grooves, which separate circumferentially adjacent lugs.

The tire has at least first and second lugs. The lugs alternate circumferentially between a first lug and a second lug. Each first lug has three tread elements. The free tread elements in the first lug are separated by a first and a second narrow groove. Each second lug has two tread elements. The two tread elements of the second lug are separated by a third narrow groove.

DEFINITIONS

For ease of understanding this disclosure, the following terms are disclosed.

"Axi" and "Axially" are used to refer to lines or directions that are parallel to the axis of rotation of the tire.

"Circumferential" means lines or directions extending along the perimeter of the surface of the annular tire parallel to the equatorial plane (EP) and perpendicular to the axial direction.

"Crown" refers to the circumferentially outermost portion of the carcass substantially within the width limits of the tread.

"Equatorial plane" (EP) means the plane perpendicular to the tire's axis of rotation and passing through the center of its tread.

"Footprint" means the contact patch or area of contact of the tire tread with a flat surface at zero speed and under normal load pressure or under specified pressure and speed conditions.

"Groove" means an elongated void area in a tread that may extend circumferentially or laterally about the tread in a straight, curved or zigzag manner. The groove width is equal to the tread surface area occupied by a groove or groove portion, divided by the length of such groove or groove portion; thus, the groove width is its average width over its length. Grooves, as well as voids, reduce the stiffness of tread regions in which they are located. The depth of a groove may vary around the circumference of the tread, or the depth of one groove may be constant but vary from the depth of another groove in a tire.

"Lateral" means an axial direction.

"Leading" refers to a portion or part of the tread that contacts the ground first, with repect to a series or such parts or portions, during rotation of the tire in the preferred direction of travel.

"Lugs" means a radial rows of tread rubber extending across the width of the tire. At least part of the lug is in direct contact with the ground or road surface. A lug can be made up of a plurality of tread elements that are separated by grooves.

"Nonskid" means the depth of grooves in a tire tread.

"Pitch" means the difference from one peak in the tread pattern to the next. Pitch refers to the circumferential distance from one design feature in the tread pattern to the next similar design feature.

"Pneumatic tire" means a laminated mechanical device of generally toroidal shape, usually an open torous, having beads and a tread and made of rubber, chemicals, fabric and steel or other materials. When mounted on a wheel of a motor vehicle, the tire through its tread, provides traction and contains the fluid that sustains the vehicle load.

"Stiffness" means the measure of a tire's ability to act like a spring.

"Tie Bar" refers to an extra thickness of rubber at the bottom of a groove such that, in the location where the extra rubber is present, the groove depth is less than the groove depth at all other locations. Tie bars stabilize a lug by limiting the independent movement of two portions of a lug that are separated by a groove. Tie bars can also be present between two adjacent lugs.

"Trailing" refers to a portion or part of the tread that contacts the ground last, with respect to a series of such parts or portions, during rotation of the tire in the preferred direction of travel.

"Tread" means a molded rubber component that when bonded to a tire casing, includes that portion of the tire that comes into contact with the road when the tire is normally inflated and under normal load.

"Tread Centerline" refers the intersection of the equatorial plane (EP) with the tread.

"Tread Width" means the arc length of the tread surface in the axial direction, that is, in a plane parallel to the axis of rotation of the tire.

BRIEF DESCRIPTION OF DRAWINGS

The invention will be described by way of example and with reference to the accompanying drawings in which.

DETAILED DESCRIPTION OF THE INVENTION

Figure 1:
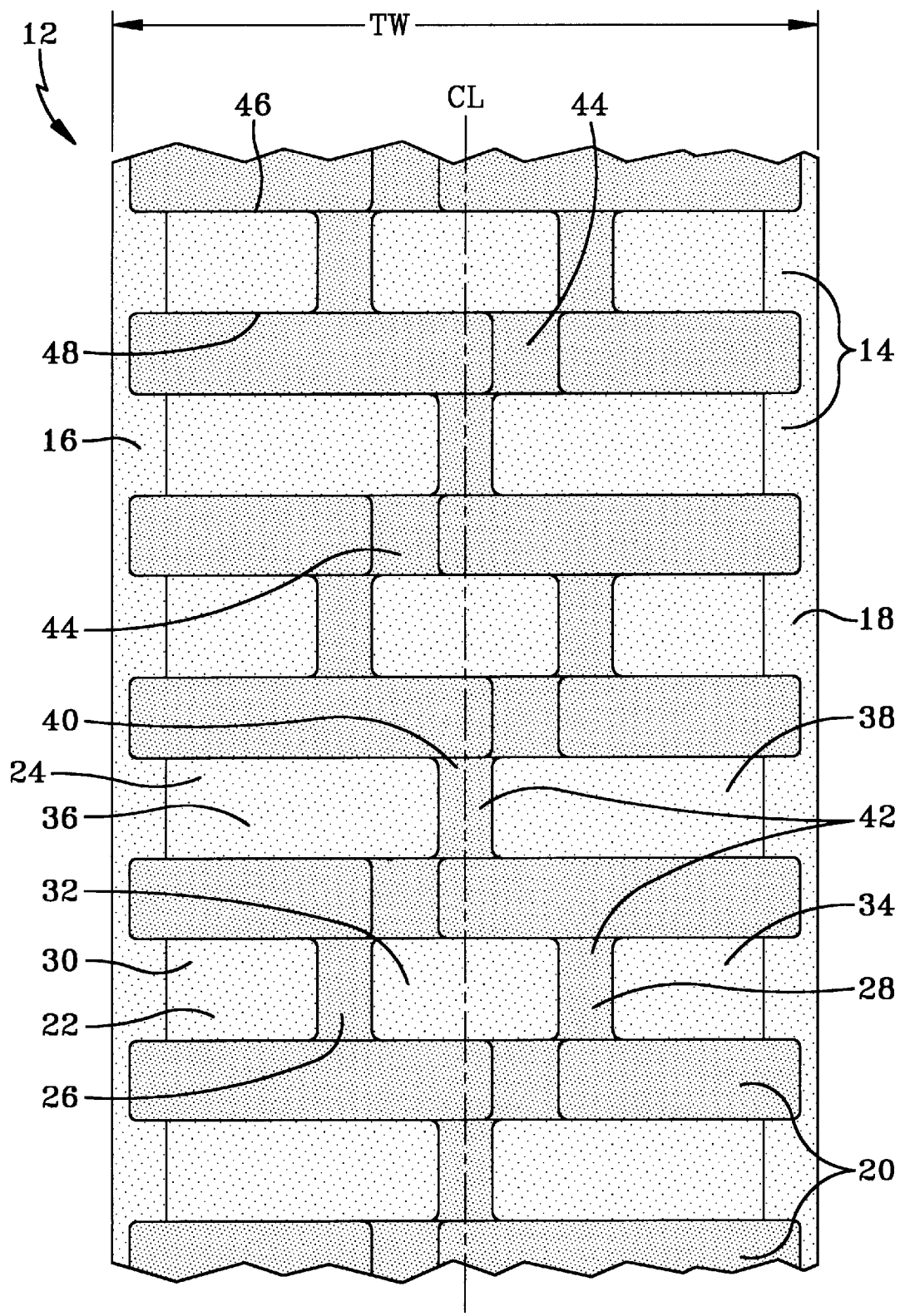
FIG. 1 is a view of an embodiment of the invention.

FIG. 1. shows a cut away of the tread 12 of the pneumatic tire 10 of the invention. The tread 12 has a plurality of lugs 14 that extend across the tread 12 from the first shoulder 16 to the second shoulder 18. The tread 12 also has a plurality of wide grooves 20. Each wide groove 20 separates circumferentially adjacent lugs 14.

The tire 10 has at least a first lug 22 and a second lug 24. The lugs 14 alternate circumferentially between the first lug 22 and the second lug 24. Each first lug 22 has three tread elements, the first tread element 30, the second tread element 32, and the third tread element 34. A tread element is a portion of a respective lug 14 that makes contact with the ground or road surface and is separated from adjacent tread elements of the same lug 14 by a groove. The three first lug tread elements 30, 32, 34 are separated by a first and a second narrow groove 26, 28. The first narrow groove 26 is located between the first tread element 30 and the second tread element 32. The second narrow groove 28 is located between the second tread element 32 and the third tread element 34. Each second lug 24 has two tread elements, the fourth tread element 36 and the fifth tread element 38. The two second lug tread elements 36, 38 are separated by a third narrow groove 40.

The thread 12 has a tread width TW. Each wide groove 20 has a width in a circumferential direction in the range of 10% to 40% of the tread width TW. Each narrow groove has a width in a lateral direction in the range of 5% to 20% of the tread width TW.

Each wide groove 20 has a depth of full nonskid NSK. Each narrow groove has a depth in the range of 10% to 90% of the wide groove depth NSK. Since the narrow grooves have a reduced depth as compared to the wide grooves they form tie bars 42 in the area below each narrow groove.

In the embodiment of the invention shown in FIG. 1, each wide groove 20 has at least one wide groove tie bar 44. The wide groove tie bar 44 connects circumferentially adjacent lugs 14 and may be located at any location within the respective wide groove 20. The wide groove tie bars 44 increase the circumferential bending stiffness of the tread 12. This increased circumferential bending stiffness reduces the amount of protrusion of the leading edge 46 of each lug 14 by limiting the bending of the tire 10 as it enters the footprint. As a result, the amplitude of the vibration caused by the impact and the snap back of each lug 14 is reduced. The tread 12 in FIG. 1 also has a higher lateral bending stiffness than the prior art tires. This increased lateral bending stiffness is due to the use of the narrow groove tie bars 42. These narrow groove tie bars 42 allow the tread 12 to have some flexibility in a lateral direction, but also allows the tread 12 to retain some lateral stiffness. The higher lateral bending stiffness causes the tire 10 to roll more toward its centerline; resulting in reduced impact from the shoulder portions of each lug 14. Although decreasing the lateral bending stiffness generally results in deceased traction, the longer tread elements in the second lug 24 allow the tread 12 to accept increased torque loads, thus limiting any reduction in traction caused by increasing the lateral bending stiffness. Additionally, the use of the narrow groove tie bars 42 limits the independent movement of the respective tread elements further increasing the tread's ability to accept increased torque loads.

Figure 2:
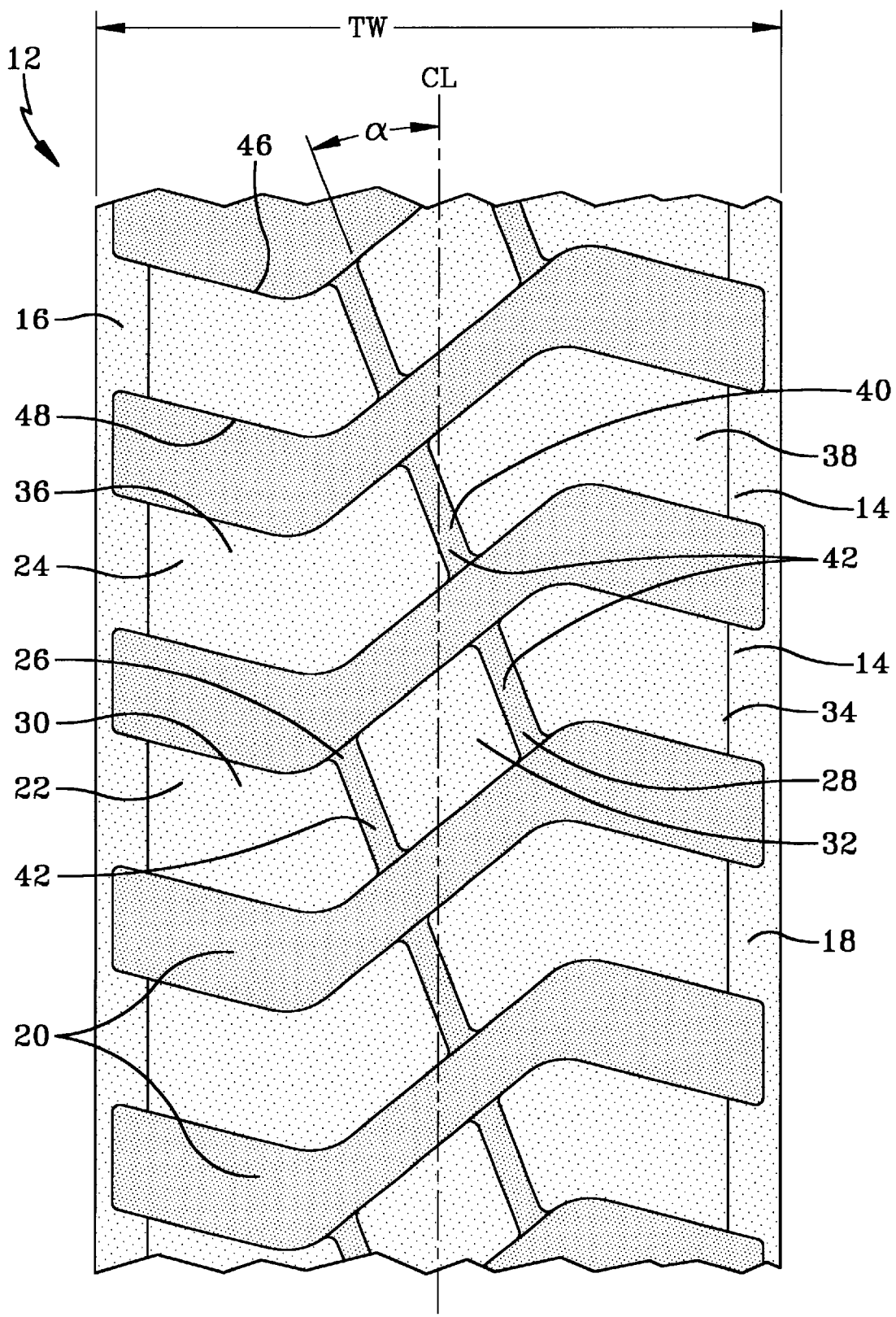
FIG. 2 is a view of an embodiment of the invention where the respective lugs are inclined from a first shoulder to a second shoulder.

FIG. 2 shows an embodiment of the invention where each lug 14 is inclined from a first shoulder 16 to a second shoulder 18. To be considered inclined, the location where the leading edge 46 meets the first shoulder 16 must trail the location where the leading edge 46 meets the second shoulder 18. Although the lugs 14 shown in FIG. 2 may not be inclined at all times as they cross the tread width TW, each lug 14 is considered to be inclined because the leading edge 46 at the first shoulder 16 trails the leading edge 46 at the second shoulder 18.

The angle of the respective narrow grooves 26, 28, 40 may vary as each crosses a respective lug 14. In a preferred embodiment, each narrow groove 26, 28, 40 is angled at an angle α, relative to the centerline of the tread 12, in the range of 15 to 45 degrees. In the preferred embodiment of the invention, the first narrow groove 26 of each first lug 22 is aligned with the third narrow groove 40 of a circumferentially adjacent second lug 24 when moving in the preferred direction of travel. The respective third narrow groove 40 is further aligned with the second narrow groove 28 of a circumferentially adjacent, next first lug 22. As a result, three narrow grooves in three circumferentially adjacent lugs 14 become aligned. Although not required, in the preferred embodiment, the third narrow groove 40 at least partially crosses the centerline of the tread 12.

The embodiment of FIG. 2 further improves the working footprint of the tire 10. The incline of the respective lugs 14 causes an overlap as each lug 14 enters the footprint of the tire 10. Each lug 14 enters the footprint smoothly because the leading portion of the footprint is still on a respective tread element near the first shoulder 16 as the next lug enters the footprint near the second shoulder 18. Additionally, the inclined nature of the respective lugs 14 increases the circumferential bending stiffness by changing the wide grooves 20 from an axal direction to a more inclined direction. The combination of the overlap of the respective lugs 14 and the increased circumferential bending stiffness decreases the amplitude of the vibration caused by the impact and the snap back of lugs 14. Additionally, since the tread 12 in FIG. 2 has angled biting edges, the lateral traction is improved over that shown in FIG. 1. The long tread elements, especially those of the second lug 24, enable the tread 12 to accept high torque loads resulting in improved circumferential and lateral traction for the tread 12.

Figure 3:
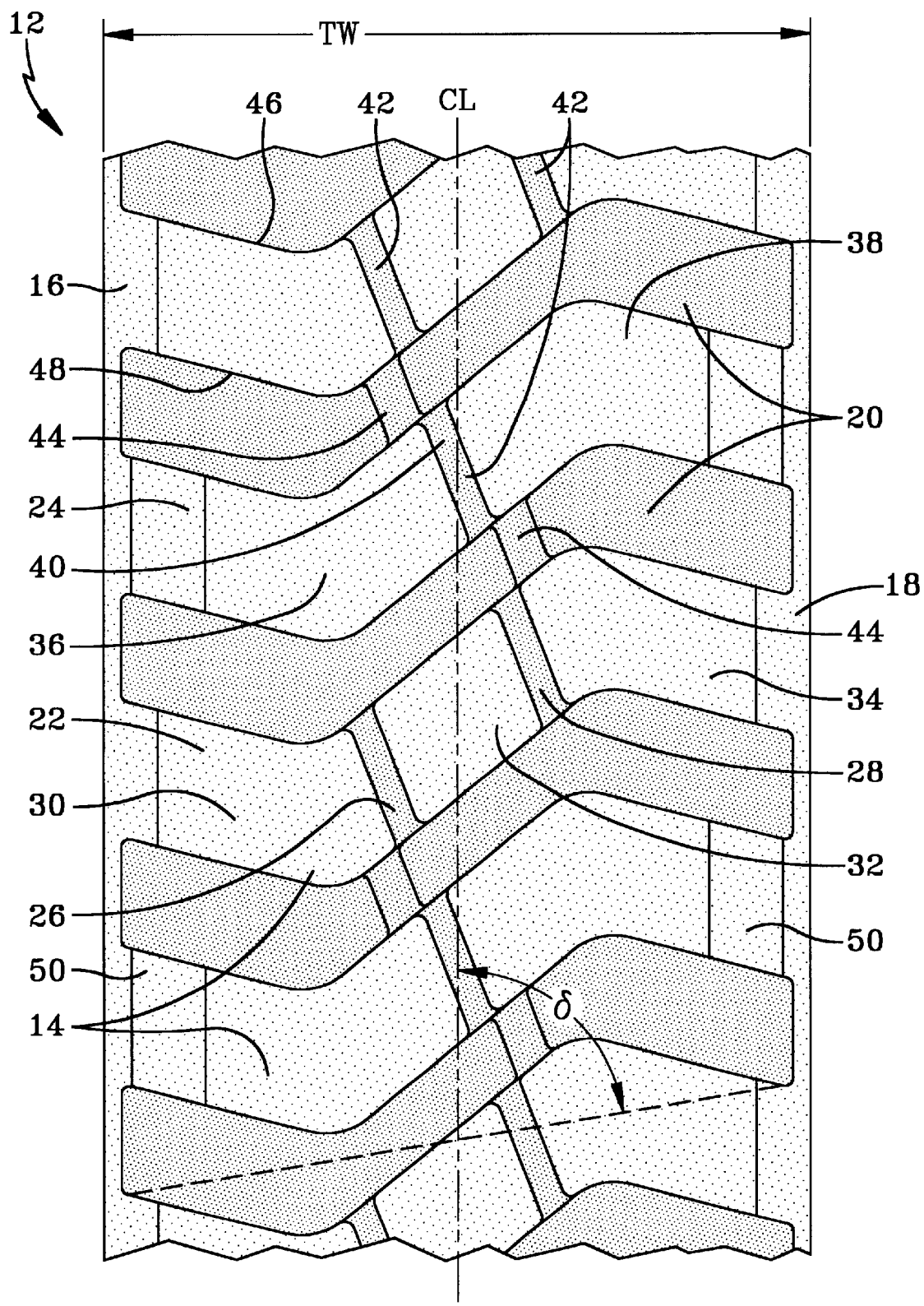
FIG. 3 shows a detailed view of the preferred embodiment of the invention.
Figure 4:
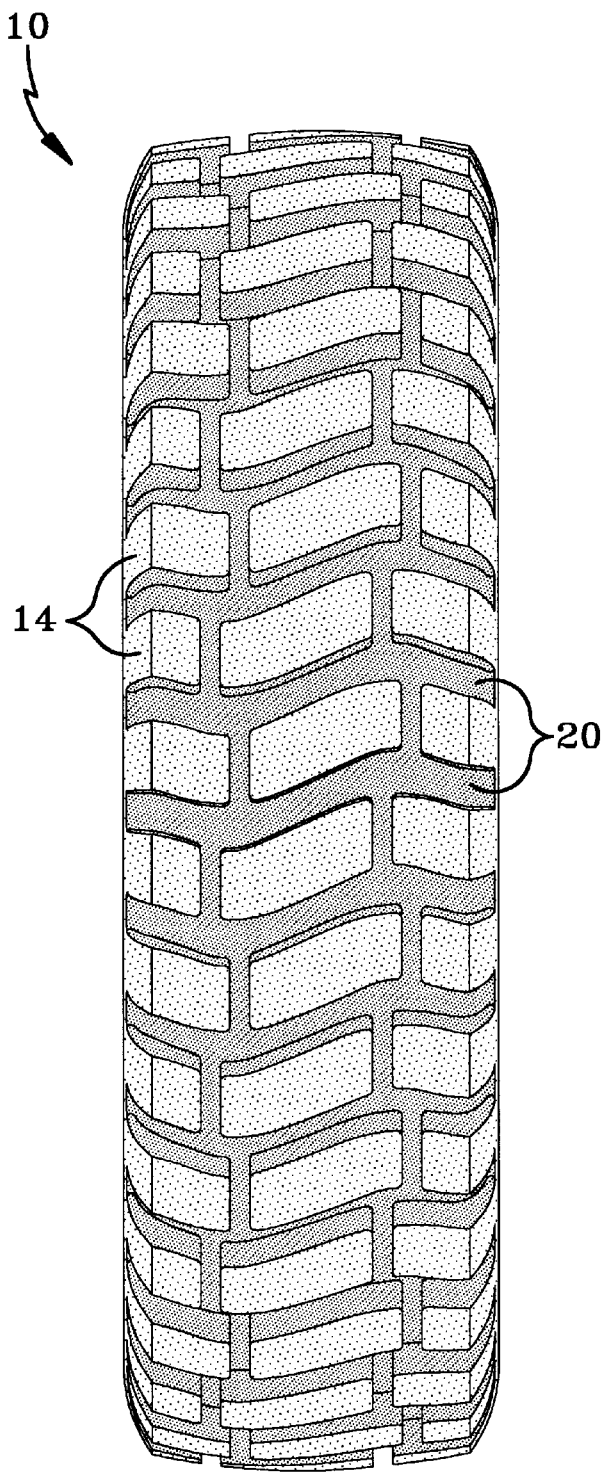
FIG. 4 is a view of the Goodyear RL-2 prior art off-road tire.
Figure 5:
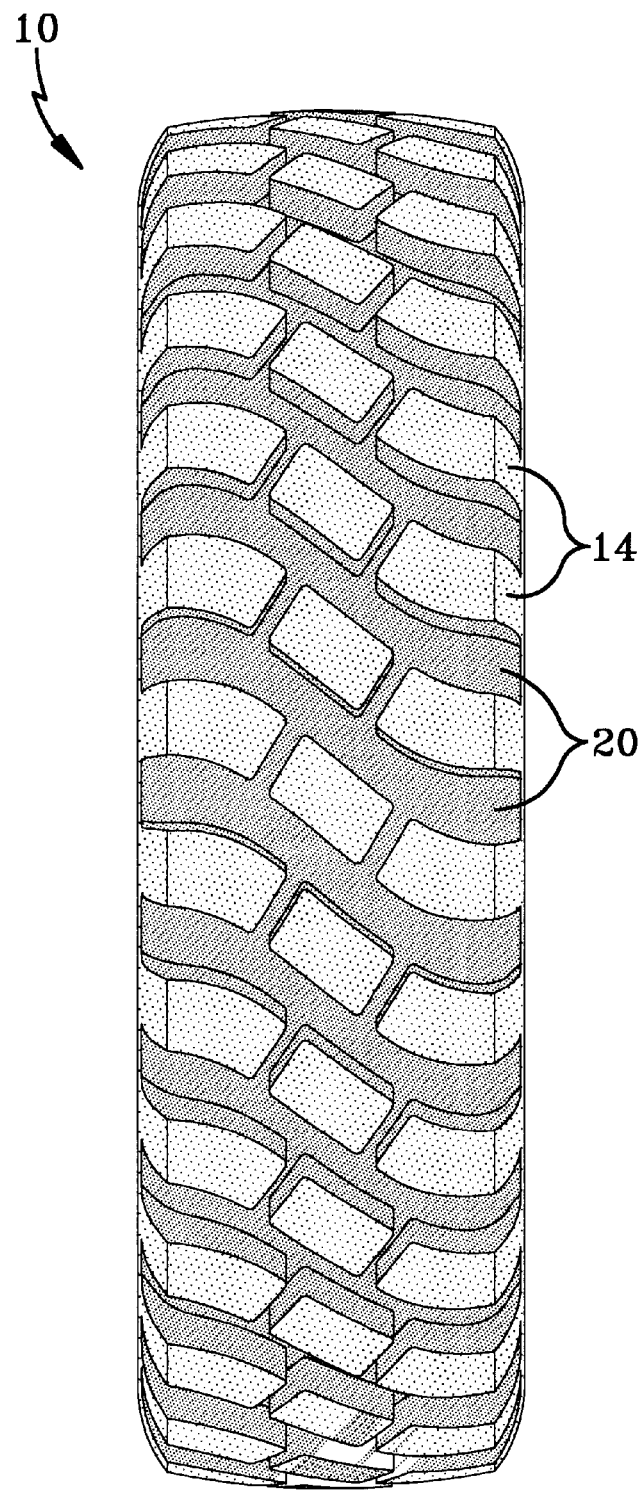
FIG. 5 is a view of a second prior art tire.

FIG. 3 shows the preferred embodiment of the invention. In the preferred embodiment, the lugs 14 are inclined from the first shoulder 16 to the second shoulder 18 at an angle δ, relative to the centerline of the tread 12, in the range of 45 to 85 degrees. Since the angle may vary across the tread 12, the angle β relates to the angle between the centerline and a straight line connecting the leading edge 46 of a respective lug 14 at a first shoulder 16 and the leading edge 46 of the same lug 14 at a second shoulder 18. Each wide groove 20 contains at least one wide groove tie bar 44. The wide groove tie bars 44 alternate across the centerline of the tire 10 from one wide groove 20 to the next. Each wide groove tie bar 44 has an edge, closest to the centerline of the tire 10, that aligns with an edge of the third narrow groove 40. Additionally, in the preferred embodiment, each second lug 24 has as many as two offset grooves 50. An offset groove 50 is a groove located at the point where the second lug 24 meets the respective shoulder 16, 18. Each offset groove 50 has a width in the range of 3% to 25% of the tread width TW.

As can be seen in FIG. 3, each wide groove 20 may widen slightly as it approaches a respective shoulder 16, 18. This widening near a respective shoulder 16, 18 helps to eject mud and other foreign materials that may become lodged in a tread 12. The offset grooves 50, which may be located on each second lug 24, help to further widen the opening of the wide grooves 20 at the respective shoulders 16, 18, providing additional help for ejecting mud and other foreign materials from the tread 12.

The tire 10 of the invention may be molded as one skilled in the art would typically mold a tire. A nominal rim diameter of greater than 20 inches is preferred for the tire 10 of this invention. Additionally, the pitching of the tire 10 may be changed to reduce the noise generated by the tire 10.

What is claimed is:

1. A pneumatic tire for off-road use, the pneumatic tire having a tread, a plurality of lugs extending across the tread from a first shoulder to a second shoulder, a plurality of wide grooves separating respective, circumferentially adjacent lugs, the tread being characterized by:

the plurality of lugs including at least first and second lugs, the lugs alternating circumferentially between the first lug and the second lug, each first lug having three tread elements, the three first lug tread elements being separated by a first and second narrow groove, each second lug having two tread elements, the second lug tread elements being separated by a third narrow groove and wherein each lug is inclined from the first shoulder to the second shoulder and each narrow groove being angled relative to a centerline of the tread in the range of 15° to 45° and each third narrow groove at least partially crossing the centerline of the tread, the narrow grooves being oriented such that the first narrow groove of a respective first lug aligns with the third narrow groove of a circumferentially adjacent second lug, the respective third narrow groove further aligns with the second narrow groove of a circumferentially adjacent, next first lug.

2. A pneumatic tire as in claim 1, the tread further being characterized by:

each wide groove having a depth, each narrow groove having a depth in the range of 10% to 90% of the wide groove depth.

3. A pneumatic tire as in claim 1, the tread having a width TW, the tread further being characterized by:

each narrow groove having a width in the range of 5% to 20% of the tread width TW.

4. A pneumatic tire as in claim 1, the tread further being characterized by:

each second lug being at least partially offset relative to a tread shoulder, each offset extending from a respective shoulder toward a centerline of the tread.

5. A pneumatic tire as in claim 4, the tread having a width TW, the tread further being characterized by:

each offset having a width in the range of 3% to 25% of the tread width TW.

6. A pneumatic tire as in claim 1, the tread having a width TW, the tread further being characterized by:

each wide groove having a circumferential length in the range of 10% to 40% of the tread width TW.

7. A pneumatic tire as in claim 1, the tread further being characterized by:

each wide groove having at least one wide groove tie-bar, each wide groove tie bar connecting circumferentially adjacent lugs.

8. A pneumatic tire as in claim 7, the tread further being characterized by:

each wide groove having a depth, each wide groove tie-bar having a height in the range of 10% to 80% of the wide groove depth.

* * * * *